United States Patent
Fiorani et al.

(10) Patent No.: US 12,395,885 B2
(45) Date of Patent: *Aug. 19, 2025

(54) QOS FLOW MANAGEMENT OVER E1

(71) Applicant: Telefonaktiebolaget LM Ericsson (publ), Stockholm (SE)

(72) Inventors: Matteo Fiorani, Solna (SE); Martin Skarve, Enebyberg (SE); Göran Hansson, Stockholm (SE); Christer Gustafsson, Huddinge (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/593,573

(22) Filed: Mar. 1, 2024

(65) Prior Publication Data

US 2024/0236758 A1 Jul. 11, 2024

Related U.S. Application Data

(63) Continuation of application No. 17/045,387, filed as application No. PCT/IB2019/052791 on Apr. 4, 2019, now Pat. No. 11,924,670.

(60) Provisional application No. 62/653,675, filed on Apr. 6, 2018.

(51) Int. Cl.
*H04W 28/02* (2009.01)
*H04W 28/06* (2009.01)

(52) U.S. Cl.
CPC ... *H04W 28/0268* (2013.01); *H04W 28/0252* (2013.01); *H04W 28/06* (2013.01)

(58) Field of Classification Search
CPC .......................... H04W 28/0268; H04W 28/06
See application file for complete search history.

(56) References Cited

U.S. PATENT DOCUMENTS

| 8,504,712 B2 | 8/2013 | Lee | |
|---|---|---|---|
| 11,329,926 B2* | 5/2022 | Liu | H04L 43/0852 |
| 11,533,651 B2* | 12/2022 | Liu | H04W 88/085 |

(Continued)

FOREIGN PATENT DOCUMENTS

| CN | 101296493 A | 10/2008 |
|---|---|---|
| EP | 2645764 A1 | 10/2013 |

(Continued)

OTHER PUBLICATIONS

3GPP TSG RAN WG3 meeting #97; Berlin, Germany; Source: Huawei; Title: Idle to connected procedure for CP-UP separation (R3-173131)—Aug. 21-25, 2017.

(Continued)

Primary Examiner — Parth Patel
(74) Attorney, Agent, or Firm — Baker Botts L.L.P.

(57) ABSTRACT

A method is provided by a central-unit-control plane (CU-CP) of a network node for exchanging information with a central-unit user plane (CU-UP) of the network node to manage Quality of Service (QoS) flows for the optimization of radio resources. The method includes transmitting, to the CU-UP, a request for flow information for at least one QoS flow and receiving, from the CU-UP of the network node, the flow information for the at least one QoS flow. Based on the flow information for the at least one QoS flow, at least one action is taken.

16 Claims, 16 Drawing Sheets

(56) References Cited

U.S. PATENT DOCUMENTS

| | | | |
|---|---|---|---|
| 11,665,577 B2* | 5/2023 | Han | H04L 1/0017 370/235 |
| 2018/0368109 A1* | 12/2018 | Kim | H04W 72/04 |
| 2019/0069333 A1* | 2/2019 | Kim | H04W 36/0033 |
| 2019/0075552 A1* | 3/2019 | Yu | H04W 24/10 |
| 2019/0182716 A1* | 6/2019 | Futaki | H04W 76/10 |
| 2019/0253917 A1* | 8/2019 | Dao | H04W 28/0268 |
| 2019/0313244 A1* | 10/2019 | Wang | H04W 24/02 |
| 2019/0356453 A1* | 11/2019 | Li | H04W 4/12 |
| 2019/0357076 A1* | 11/2019 | Han | H04W 28/0268 |
| 2020/0053814 A1* | 2/2020 | Minokuchi | H04W 28/10 |
| 2020/0169913 A1* | 5/2020 | Byun | H04W 76/15 |
| 2020/0178326 A1* | 6/2020 | Sirotkin | H04W 76/12 |
| 2020/0205050 A1* | 6/2020 | Shah | H04W 36/22 |
| 2020/0229023 A1* | 7/2020 | Ke | H04W 28/0268 |
| 2020/0252813 A1* | 8/2020 | Li | H04W 24/08 |
| 2020/0267559 A1* | 8/2020 | Mahoney | H04W 24/02 |
| 2020/0275498 A1* | 8/2020 | Fiorani | H04W 76/11 |
| 2020/0280937 A1* | 9/2020 | Yang | H04W 76/27 |
| 2020/0344719 A1* | 10/2020 | Luo | H04W 68/005 |
| 2020/0367109 A1* | 11/2020 | Chen | H04W 28/18 |
| 2020/0396631 A1* | 12/2020 | Han | H04W 28/0268 |
| 2021/0014722 A1* | 1/2021 | Han | H04W 28/0268 |
| 2021/0099316 A1* | 4/2021 | Wang | H04W 4/24 |
| 2021/0160730 A1* | 5/2021 | Fiorani | H04W 28/0252 |
| 2021/0176658 A1* | 6/2021 | Wang | H04B 7/155 |
| 2021/0185755 A1* | 6/2021 | Kim | H04W 68/005 |
| 2021/0227378 A1* | 7/2021 | Wang | H04W 36/0033 |

FOREIGN PATENT DOCUMENTS

| | | |
|---|---|---|
| TW | I31918 A | 7/2009 |
| WO | WO2013174335 A2 | 11/2013 |

OTHER PUBLICATIONS

3GPP TSG-RAN WG3 #97; Berlin, Germany; Source: Ericsson, AT&T, Intel, Vodafone (Tdoc R3-173334)—Aug. 21-25, 2017.

3GPP TSG RAN WG3 Meeting #98; Reno, Nevada; Source: ZTE; Title: Discussion on E1 interface functions (R3-174400)—Nov. 27-Dec. 1, 2017.

3GPP TSG-RAN WG3 #99; Athens, Greece; Source: Ericsson; Title: E1 Setup procedure (Tdoc R3-181300)—Feb. 26-Mar. 2, 2018.

PCT International Search Report for International application No. PCT/IB2019/052791—Jul. 11, 2019.

PCT Written Opinion of the International Searching Authority issued for International application No. PCT/IB2019/052791—Jul. 11, 2019.

3GPP TS 23.214 v15.2.0; Technical Specification; 3rd Generation Partnership Project; Technical Specification Group Services and System Aspects; Architecture enhancements for control and user plane separation of EPC nodes; Stage 2 (Release 15)—Mar. 2018.

Examination Report issued by Intellectual Property India for Application No. 202017042366—Dec. 22, 2021.

3GPP TR 38.806 v15.0.0 (Dec. 2017); 3rd Generation Partnership Project; Technical Specification Group Radio Access Network; Study of separation of NR Control Plane (CP) and User Plane (UP) for split option 2 (Release 15).

3GPP Draft; Meeting Report—3GPP TSG RAN WG3 AH-1801, Monday, Jan. 22, 2018, chairman Gino Masini (Ericsson); Sophia Antipolis, France.

3GPP TSG-RAN WG2 Meeting #93bis; Dubrovnik, Croatia, Apr. 11-15, 2016; Agenda Item: 15.1.3; Source: Mediatek Inc. (Session Chair); Title: Report of the LTE breakout session (Nb-Iot) (R2-163133).

Extended European Search Report issued for International application No. 24190008.3-1215 / 4436247—Oct. 2, 2024.

* cited by examiner

QOS FLOW MANAGEMENT OVER E1

PRIORITY

This nonprovisional application is a continuation, under 35 U.S.C. § 120, of U.S. patent application Ser. No. 17/045,387 filed on Oct. 5, 2020 and is entitled "QOS FLOW MANAGEMENT OVER E1"; which is a U.S National Stage entry of International Patent Application Serial No. PCT/IB2019/052791 filed Apr. 4, 2019; which claims priority to U.S. Provisional Patent Application No. 62/653,675 filed Apr. 6, 2018 all of which are hereby incorporated by reference in their entirety.

BACKGROUND

The current 5G RAN (NG-RAN) architecture is described in TS38.401 and illustrated in FIG. 1. The NG architecture can be further described as follows:
  The NG-RAN consists of a set of gNBs connected to the 5GC through the NG.
  An gNB can support FDD mode, TDD mode or dual mode operation.
  gNBs can be interconnected through the Xn.
  A gNB may consist of a gNB-CU and gNB-DUs.
  A gNB-CU and a gNB-DU is connected via F1 logical interface.
  One gNB-DU is connected to only one gNB-CU.
  NG, Xn and F1 are logical interfaces. For NG-RAN, the NG and Xn-C interfaces for a gNB consisting of a gNB-CU and gNB-DUs, terminate in the gNB-CU. For EN-DC, the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.
  The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all AMFs within an AMF Region. The AMF Region is defined in 3GPP TS 23.501.
  The general principles for the specification of the F1 interface are as follows:
  the F1 interface is to be open;
  the F1 interface supports the exchange of signalling information between the endpoints, in addition the interface shall support data transmission to the respective endpoints;
  from a logical standpoint, the F1 is a point-to-point interface between the endpoints (a point-to-point logical interface should be feasible even in the absence of a physical direct connection between the endpoints);
  the F1 interface supports control plane and user plane separation;
  the F1 interface separates Radio Network Layer and Transport Network Layer;
  the F1 interface enable exchanges of UE associated information and non-UE associated information;
  the F1 interface is defined to be future proof to fulfil different new requirements, support new services and new functions;
  one gNB-CU and set of gNB-DUs are visible to other logical nodes as a gNB. The gNB terminates X2, Xn, NG and S1-U interfaces;
  the CU may be separated in control plane (CP) and user plane (UP).

3GPP RAN WG3 has also started working on a new open interface between the control plane (CU-CP) and the user plane (CU-UP) parts of the CU. The related agreements are collected in TR 38.806. The open interface between CU-CP and CU-UP is named E1. FIG. 2 illustrates the split gNB architecture.

Three deployment scenarios for the split gNB are shown in TR 38.806:
  Scenario 1: CU-CP and CU-UP centralized;
  Scenario 2: CU-CP distributed and CU-UP centralized;
  Scenario 3: CU-CP centralized and CU-UP distributed.
The E1 application protocol (E1AP) is defined in TS 38.463. The E1AP defines the messages that are exchanged between the CU-CP and the CU-UP for the sake of providing user-plane services to the UE.

The 5G QoS model is described in TS 23.501. The 5G QoS model is based on QoS Flows. The 5G QoS model supports both QoS Flows that require guaranteed flow bit rate (GBR QoS Flows) and QoS Flows that do not require guaranteed flow bit rate (non-GBR QoS Flows). The 5G QoS model also supports reflective QoS.

The QoS Flow is the finest granularity of QoS differentiation in the PDU Session. A QoS Flow ID (QFI) is used to identify a QoS Flow in the 5G System. User Plane traffic with the same QFI within a PDU Session receives the same traffic forwarding treatment (e.g. scheduling, admission threshold). The QFI is carried in an encapsulation header on N3 (and N9) i.e. without any changes to the e2e packet header. QFI shall be used for all PDU Session Types. The QFI shall be unique within a PDU Session.

The session management function (SMF) in the 5G core (5GC) performs the binding of service data flows (SDFs) to QoS Flows based on the QoS and service requirements. The SMF assigns the QFI for a new QoS Flow and derives its QoS profile from the information provided by the PCF. When applicable, the SMF provides the QFI together with the QoS profile to the (R)AN, and optionally a transport level packet marking value (e.g. the DSCP value of the outer IP header over N3 tunnel) to the (R)AN for the UL traffic. The SMF provides the SDF template (i.e. Packet Filter Set associated with the SDF received from the PCF) together with, the QoS related information, and the corresponding packet marking information, i.e. the QFI, the transport level packet marking value (e.g. the DSCP value of the outer IP header over N3 tunnel) for downlink traffic and optionally the Reflective QoS Indication to the UPF enabling classification, bandwidth enforcement and marking of User Plane traffic. For each SDF, when applicable, the SMF generates a QoS rule. Each of these QoS rules contain the QoS rule identifier, the QFI of the QoS Flow the Packet Filter Set of the UL part of the SDF template, optionally the Packet Filter Set for the DL part of the SDF template, and the QoS rule precedence value set to the precedence value of the PCC rule from which the QoS rule is generated. The QoS rules are then provided to the UE.

FIG. 3 illustrates the principle for classification and marking of User Plane traffic and mapping of QoS Flows to an access network (AN) resource. In DL, incoming data packets are classified by the UPF based on SDF templates according to the precedence of the PCC rule authorizing the service data flow, (without initiating additional N4 signalling). The UPF conveys the classification of the User Plane traffic belonging to a QoS Flow through an N3 (and N9) User Plane marking using a QFI. The AN bind QoS Flows to AN resource (i.e. Data Radio Bearers in case of 3GPP RAN). There is no strict 1:1 relation between QoS Flows and AN resources. It is up to the AN to establish the necessary AN resource that QoS Flows can be mapped to, and to release them. The AN shall indicate to the SMF when the AN resource onto which a QoS flow is mapped are released.

If no match is found and all QoS Flows are related with a DL Packet Filter Set, the UPF shall discard the DL data packet. In UL, the UE evaluates UL packets against the Packet Filter Set in the QoS rules based on the precedence value of QoS rules in increasing order until a matching QoS rule (i.e. whose packet filter matches the UL packet) is found. The UE uses the QFI in the corresponding matching QoS rule to bind the UL packet to a QoS Flow. The UE then binds QoS Flows to AN resource. If no match is found and the default QoS rule contains an UL Packet Filter Set, the UE shall discard the UL data packet. The MBR (and if applicable GBR) per SDF, if received from PCF over N7, is signalled on N4.

There currently exist certain challenge(s). For example, in the NG-RAN architecture, the NG-C (N2) interface is terminated in the CU-CP, while the NG-U (N3) interface is terminated in the CU-UP.

The CU-CP receives the information about the PDU sessions and QoS Flows to setup for a given UE from the SMF over the NG-C interface. Based on this information, the CU-CP decides which AN resource (i.e., data radio bearers—DRBs) to setup for the UE. It also decides the mapping between the QoS Flows and the DRBs, as discussed in TS 38.460. Then, the CU-CP provides the information about PDU sessions, DRBs and QoS Flows (including the mapping between DRBs and QoS Flows) to the CU-UP over the E1 interface. The CU-UP sets up the corresponding resources.

At the time of the establishment of the user-plane resources, the CU-CP does not know when/if data traffic for a given QoS Flow will be sent to/from the UE. This implies that AN resources can be allocated the whole time the UE is RRC Connected, even though no data is being transferred for the particular QoS Flow or DRB. The more UEs with AN resources allocated but not being used, the less efficient resource handling becomes in RAN. In the 5G QoS time frame, 3GPP specifies support of at least 16 DRBs per UE. The Ericsson DU is dimensioned to only a fraction of these 16 DRBs per UE, the related resources are potential future bottlenecks. An additional problem with existing solution is that the mapping of QoS flows to DRBs may become inefficiently distributed when some flows becomes inactive.

SUMMARY

To address the foregoing problems with existing solutions, disclosed is systems and methods for exchanging information between a central-unit-control plane (CU-CP) of a network node and a central-unit user plane (CU-UP) of the network node to manage Quality of Service (QoS) flows for the optimization of radio resources.

According to certain embodiments, a method performed by a CU-CP of a network node includes transmitting, to the CU-UP, a request for flow information for at least one QoS flow and receiving, from the CU-UP, the flow information for the at least one QoS flow. Based on the flow information for the at least one QoS flow, at least one action is taken.

According to certain embodiments, a network node includes processing circuitry operating as a CU-CP of the network node. The processing circuitry is configured to transmit, to a CU-UP of the network node, a request for flow information for at least one QoS flow and receive, from the CU-UP of the network node, the flow information for the at least one QoS flow. Based on the flow information for the at least one QoS flow, at least one action is taken.

According to certain embodiments, a method performed by a CU-UP of a network node includes detecting an event triggering a reporting of flow information for at least one QoS flow and transmitting, to the CU-CP of the network node, information associated with the at least one QoS flow.

According to certain embodiments, a network node includes processing circuitry operating as a CU-UP of the network node. The processing circuitry is configured to detect an event triggering a reporting of flow information for at least one QoS flow and transmit, to the CU-CP of the network node, information associated with the at least one QoS flow Certain embodiments may provide one or more of the following technical advantages. For example, a technical advantage may be that certain embodiments may allow the CU-CP and the CU-UP to exchange over the E1 interface the necessary information to manage QoS-flows and to optimize the user of radio resources.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
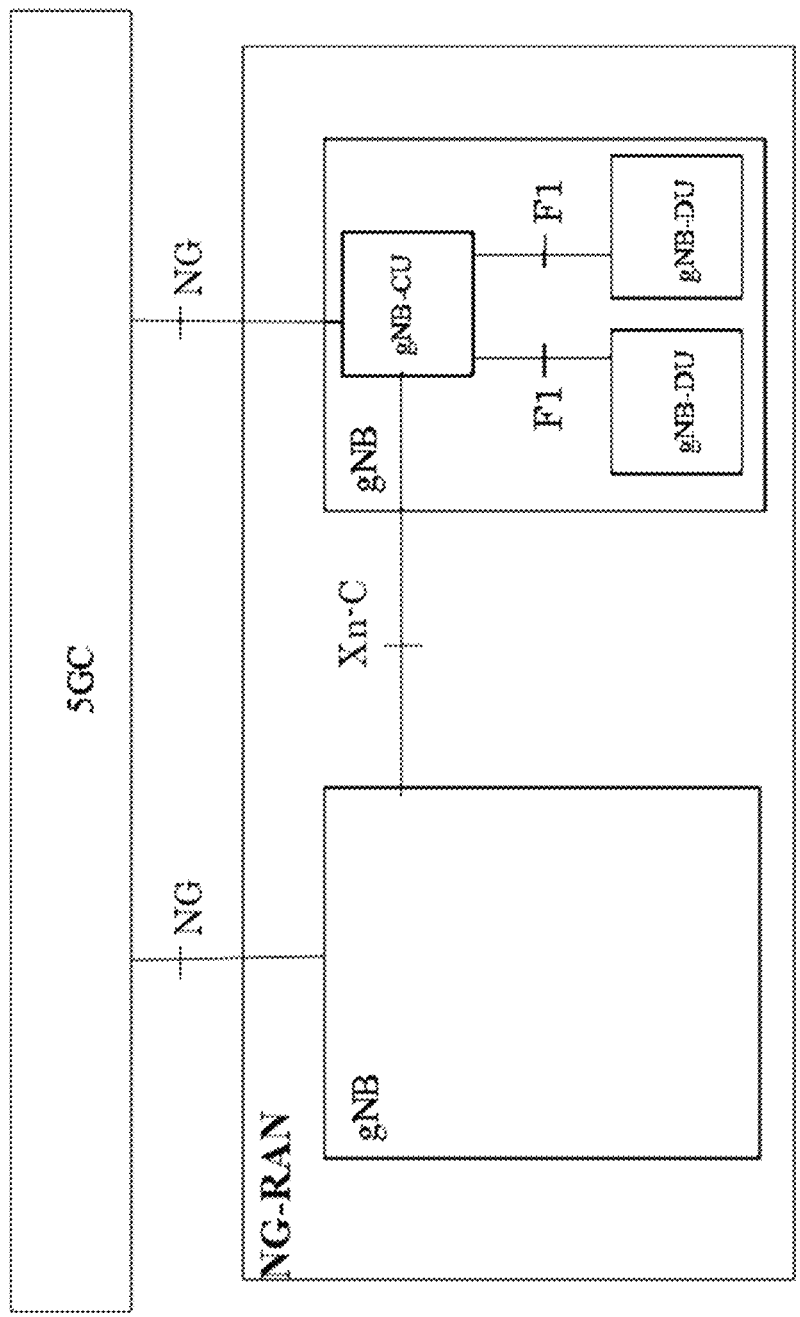
FIG. 1 illustrates the current 5G RAN (NG-RAN) architecture.
Figure 2:
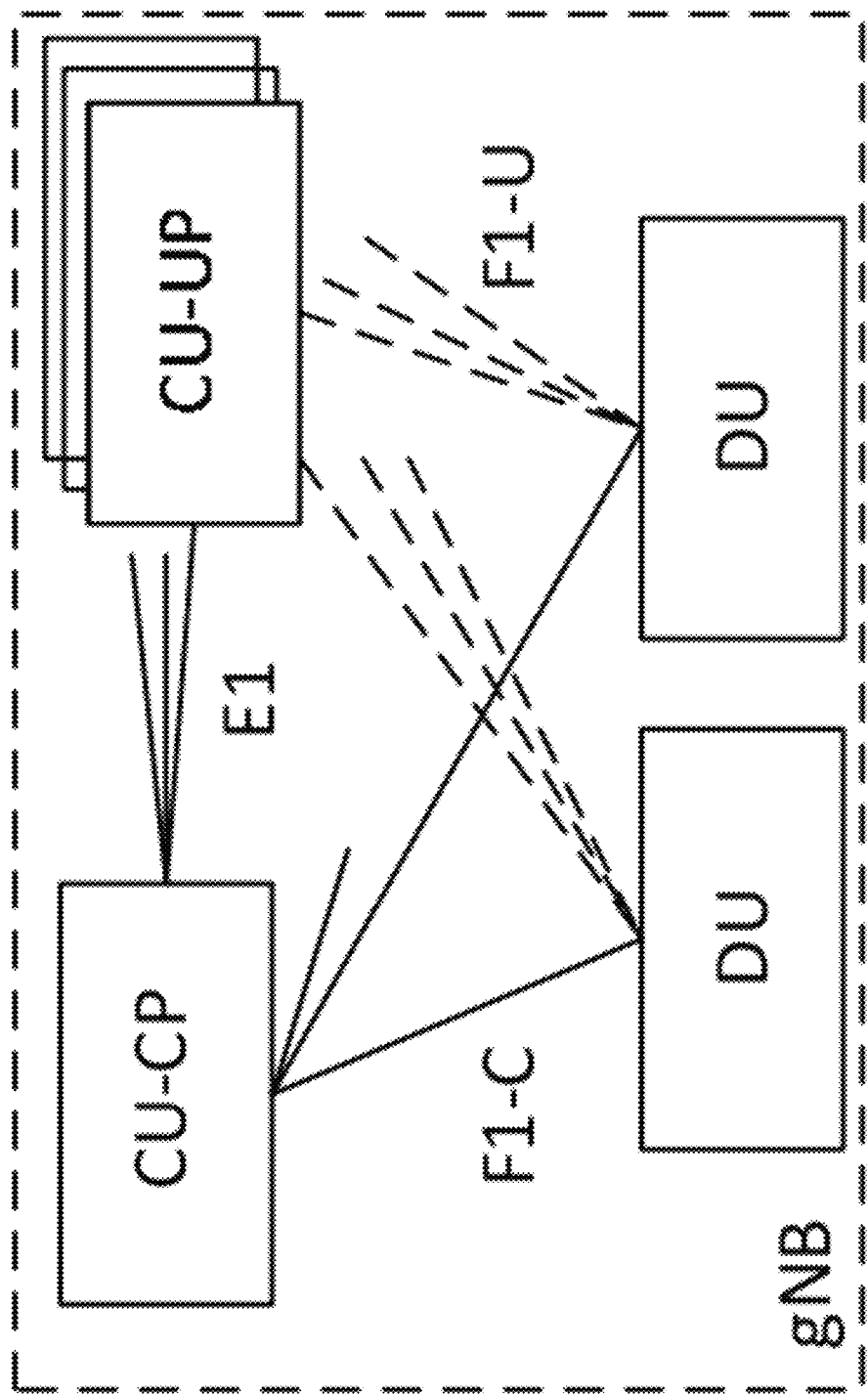
FIG. 2 illustrates the split gNB architecture.
Figure 3:
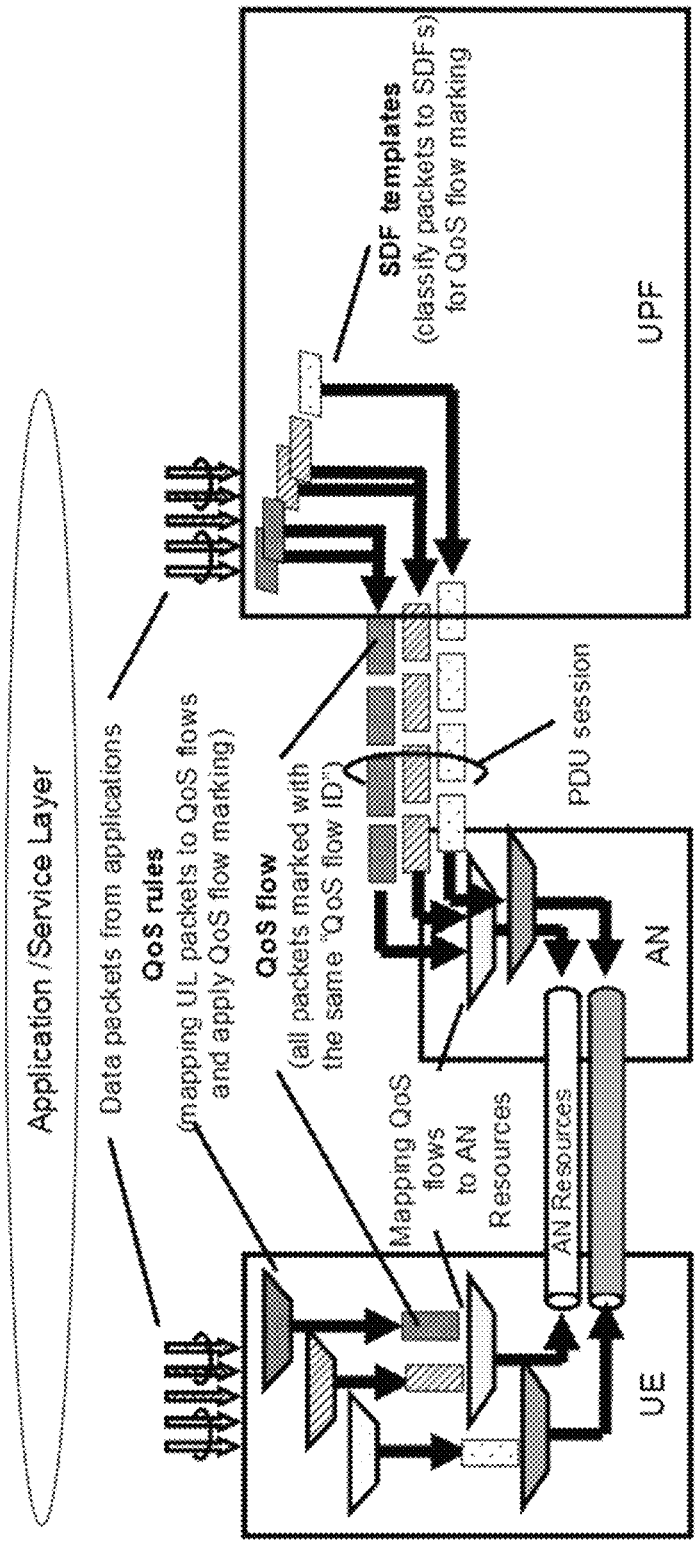
FIG. 3 illustrates the principle for classification and marking of User Plane (UP) traffic and mapping of Quality of Service (QoS) Flows to AN resource.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

For example, for the purpose of saving radio resources, the CU-CP may, instead of establishing all DRBs at RRC Connection Establishment, decide, according to certain embodiments, to establish a single, default DRB and map all the QoS Flows to this default DRB. As soon as data traffic for a given QoS Flow is detected, the CU-CP may decide to establish a new DRB and re-map the QoS Flow to the new DRB. This may require some communication between the CU-CP and the CU-UP over the E1 interface.

According to certain embodiments, the CU-UP may inform the CU-CP if a QoS-Flow that is mapped to a given DRB (other than the default DRB) is inactive for a given amount of time. Accordingly, the CU-CP may decide to remove the QoS-Flow or remap the QoS-Flow to the default DRB. The CU-CP may also decide to remove the corresponding DRB (e.g., in case that there are no more QoS-Flows mapped to it). One motivation is again to improve the efficiency in the use of radio resources. This case also requires communication between the CU-CP and the CU-UP over the E1 interface.

Currently, the E1 application protocol (as defined in TS 38.463) does not offer the signaling required to support for the use-cases described above. However, according to certain embodiments disclosed herein, solutions are provided to overcome the limitations described above.

For example, according to a particular embodiment, the CU-CP requests (over the E1 interface) the CU-UP to report information per QoS-Flow:

The CU-CP may request the CU-UP to report when new incoming DL/UL traffic for the QoS-Flow is detected for the first time. This may be done for example by adding a new optional IE in the QoS-Flow descriptor in the E1 Bearer Context Setup Request message and/or the E1 Bearer Context Modification Request message. If this IE is present, it means that the CU-CP requests the CU-UP to report new incoming UL/DL traffic for this QoS-Flow.

i. The CU-CP may also request the CU-UP to report in case that traffic is detected for a given number of QoS-Flows. For example, the CU-CP may request the CU-UP to report every third QoS-Flow for which traffic is detected. The CU-CP can use the information on the number of active QoS-Flows to decide how many DRBs to establish.

ii. The CU-CP may also report the CU-UP to report when the first flow among a set of flows to be mapped to the same DRB becomes active (but not for the other flows). The CU-CP could provide a flow group id to CU-UP that groups flows to be mapped to the same DRB. The benefit would be to keep the amount of signaling to a minimum. All flows could then be mapped to a new DRB when the first flow to be mapped to the DRB becomes active.

iii. Another option is that the CU-CP may request the CU-UP to detect that a given amount of traffic (or a given data rate) is reached for a QoS-Flow or a given DRB (i.e., given by the sum of the flows in the DRB).

iv. The CU-CP may also request the CU-UP to report in case that the QoS of a given Flow (e.g., GBR flow) cannot be fulfilled anymore and can be fulfilled again (e.g., for the purpose of reporting toward the CN).

The CU-CP may request the CU-UP to report periodically the UL and/or DL data rate for a given QoS-Flow. Alternatively, the CU-CP may request the CU-UP to report any time that the UL and/or DL data rate for the QoS-Flow goes above or below given thresholds. The CU-CP may also provide the reporting frequency (in case of periodic reporting) or the thresholds (in case of threshold-based reporting). Again, this can be done for example by introducing new IE(s) in the QoS-Flow descriptor in the E1 Bearer Context Setup Request message and/or the E1 Bearer Context Modification Request message.

i. Alternatively, the CU-CP may poll the CU-UP and request for the UL/DL data rate per QoS-Flow. This can be implemented for example by introducing a new class-1 polling procedure over the E1 interface.

The CU-CP may request the CU-UP to report the transmitted data volume (e.g., in bytes) for a given QoS-Flow and/or per-RAT (e.g., in case of dual-connectivity the data transmitted over each RAT can be reported separately). Again, periodic reporting or threshold-based reporting or polling are possible implementations (similar signaling as described above can be utilized). The CU-CP may further send this information over the S1/NG/X2/Xn interfaces for e.g., billing purposes.

The CU-CP may request the CU-UP to report in case that a given QoS-Flow remains inactive for a given amount of time. The CU-CP can also provide the inactivity timer length. Again, this can be done for example by introducing new IE(s) in the QoS-Flow descriptor in the E1 Bearer Context Setup Request message and/or the E1 Bearer Context Modification Request message. Alternatively, the CU-CP can ask the CU-UP to report when all the QoS-Flows mapped to a DRB have been inactive for a given amount of time and/or when all the QoS-Flows for a PDU session have been inactive.

As another example, according to a particular embodiment, the CU-UP may report over the E1 interface information per QoS-Flow as requested by CU-CP (e.g., using one of the embodiments described above):

The CU-UP may report every time that new incoming DL/UL traffic for the QoS-Flow is detected for the first time. This can be done either by introducing a new E1 class-2 procedure or by introducing new IEs in the E1 Bearer Context Modification Required message. The CU-UP may report in case that more QoS-Flows have become active. For example, the CU-UP can report every third QoS-Flow that becomes active (i.e., every third QoS-Flow for which UL/DL traffic is detected).

The CU-UP may report the UL and/or DL data rate per each QoS-Flow periodically or whenever the data rate of a QoS-Flow overcomes certain predefined thresholds. This can be done for example by using a new E1 class-2 reporting procedure. The CU-UP can also provide the UL and/or DL data rate per each QoS-Flow as a response to a poll received by the CU-CP (e.g., in a response message of a class-1 procedure).

The CU-UP may report the data volume in byte transmitted per QoS-Flow and/or per-RAT (e.g., in case of dual-connectivity) using a new E1 class-2 procedure or as a response to a poll received from the CU-CP (e.g., in a response message of a class-1 procedure).

The CU-UP may report every time a QoS-Flow (and/or DRB and/or PDU session and/or UE) remains inactive for a given amount of time. This can be done either autonomously or following request from the CU-CP as described above.

The same principles described in the bullet(s) above can also be applied over the Xn interface in dual-connectivity scenarios (e.g., MR-DC and NN-DC). For example, the Master NG-RAN Node (MN) can request a Secondary NG-RAN Node (SN) (hosting the PDCP/SDAP entities) to report in case that one QoS-Flow (or all the QoS-Flows in a DRB and/or PDU session) have been inactive for a given amount of time. The SN reports the inactivity per QoS-Flow (and/or per-DRB and/or per-PDU-session) as requested by the MN over the Xn interface.

Figure 4:
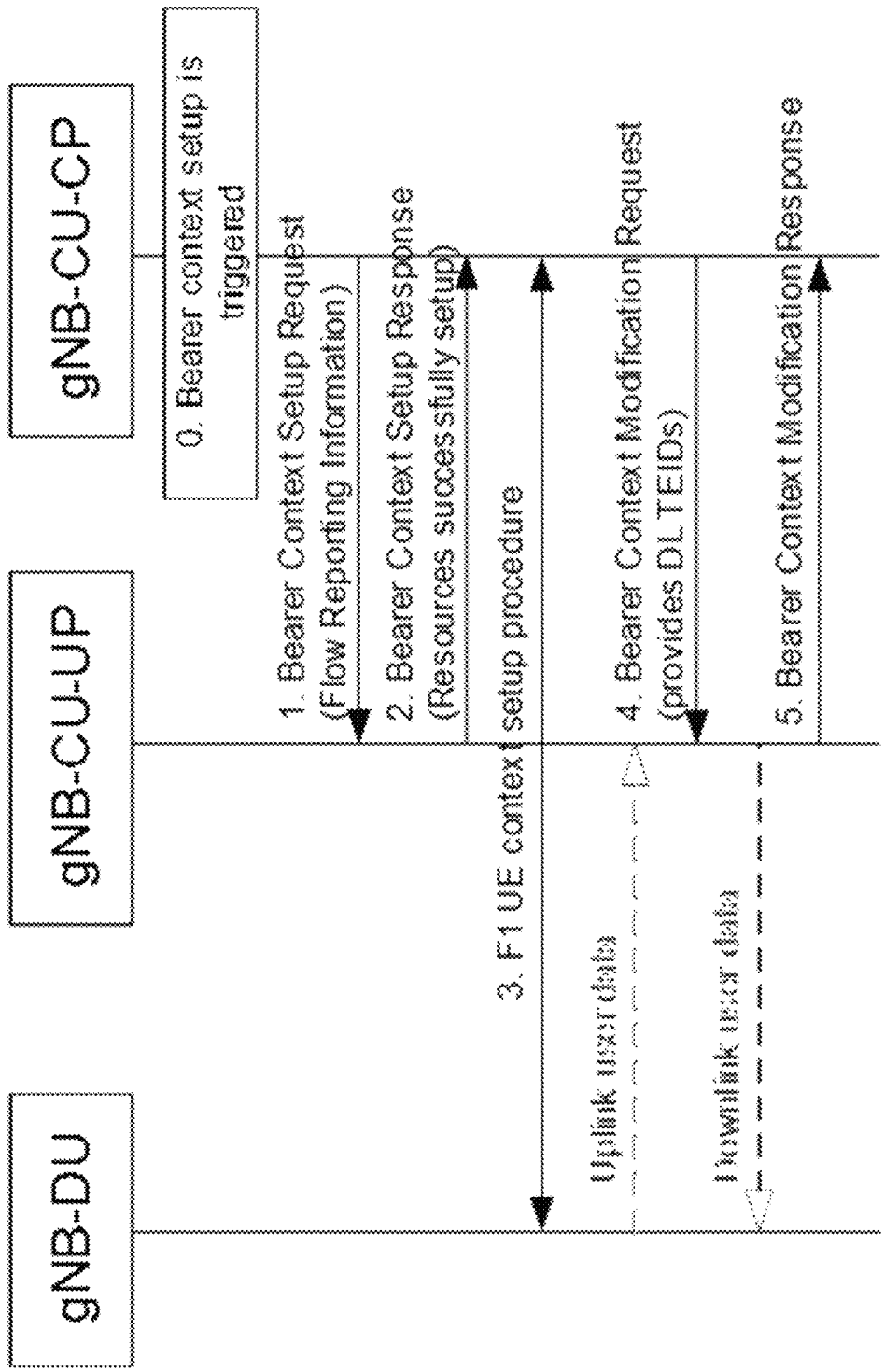
FIG. 4 illustrates a central-unit control plane (CU-CP) requesting reporting to a central-unit user plane (CU-UP) using Bearer Context Setup procedure, according to certain embodiments.

According to a particular embodiment, the CU-CP requests reporting from the CU-UP. FIG. 4 illustrates an example in which the CU-CP requests reporting to CU-UP using Bearer Context Setup procedure, according to certain embodiments. Specifically, FIG. 4 illustrates an example, though simplified, procedure for setting up the user plane resources (i.e., PDU sessions QoS-Flows and DRBs) in NG-RAN with E1 interface.

As depicted in FIG. 4, the process flow is as follows:

0. The CU-CP decides to trigger Bearer Context Setup, either autonomously or upon request from another NG-RAN node (for dual-connectivity).
1. The CU-CP sends the Bearer Context Setup Request message to the CU-UP, including information about the PDU sessions, QoS-Flows and DRBs to setup and the corresponding mapping. As part of this invention, the CU-CP may optionally include a request for reporting QoS-Flow related information. This can for example be done by introducing the following IE (namely Flow Reporting Information) in the Bearer Context Setup Request message (see TS 38.463 for the structure of the Bearer Context Setup message).

According to certain embodiments, flow reporting information may be as follows:

| IE/Group Name | Presence | Range | IE type and reference | Semantics description | Criticality | Assigned Criticality |
|---|---|---|---|---|---|---|
| QoS Flow List | | 1 | | | YES | reject |
| >QoS Flow Item | | 1 . . . <maxnooflows> | | | EACH | reject |
| >>QoS Flow Indicator | M | | | Identifies the QoS-Flow. | — | — |
| >>Report Traffic Start | O | | | Request to report in case UL/DL traffic is detected for the first time. | — | — |
| >>Report Data Rate | O | | | Request to report in case UL/DL traffic goes above a threshold | — | — |
| >>>UL Threshold | M | | | UL threshold for reporting. | — | — |
| >>>DL Threshold | M | | | DL threshold for reporting. | — | — |
| >>Report Inactvity | O | | | Request to report in case the QoS-Flow is inactive for a given amount of time. | — | — |
| >>>Timer Length | M | | | Timer length for reporting inactivity. | | |

In this non-exhaustive example, the Flow Reporting Information IE included in Bearer Context Setup Request allows the CU-CP to request the CU-UP to report when
- The UL/DL traffic for a QoS-flow is detected for the first time;
- The data rate for the flow overcomes certain thresholds (separate for UL and DL);
- The QoS-Flow is inactive for a given amount of time indicated by timer length.

2. The CU-UP responds with Bearer Context Setup Response to report the resources that have been successfully setup. The successful resource setup can be an implicit indication that the Flow Reporting is accepted and configured. If the CU-UP does not accept or does not support the Flow reporting it should either (1) respond with a Bearer Setup Failure with appropriate cause value or (2) indicate explicitly in the Bearer Context Setup Response message the Flow Report mechanisms that have been successfully configured and the ones that failed.

3.-4.-5. The CU-CP performs UE Context Setup procedure in the DU. Afterwards, the CU-CP performs a Bearer Context Modification procedure to provide the DL TEIDs to CU-UP.

Figure 5:
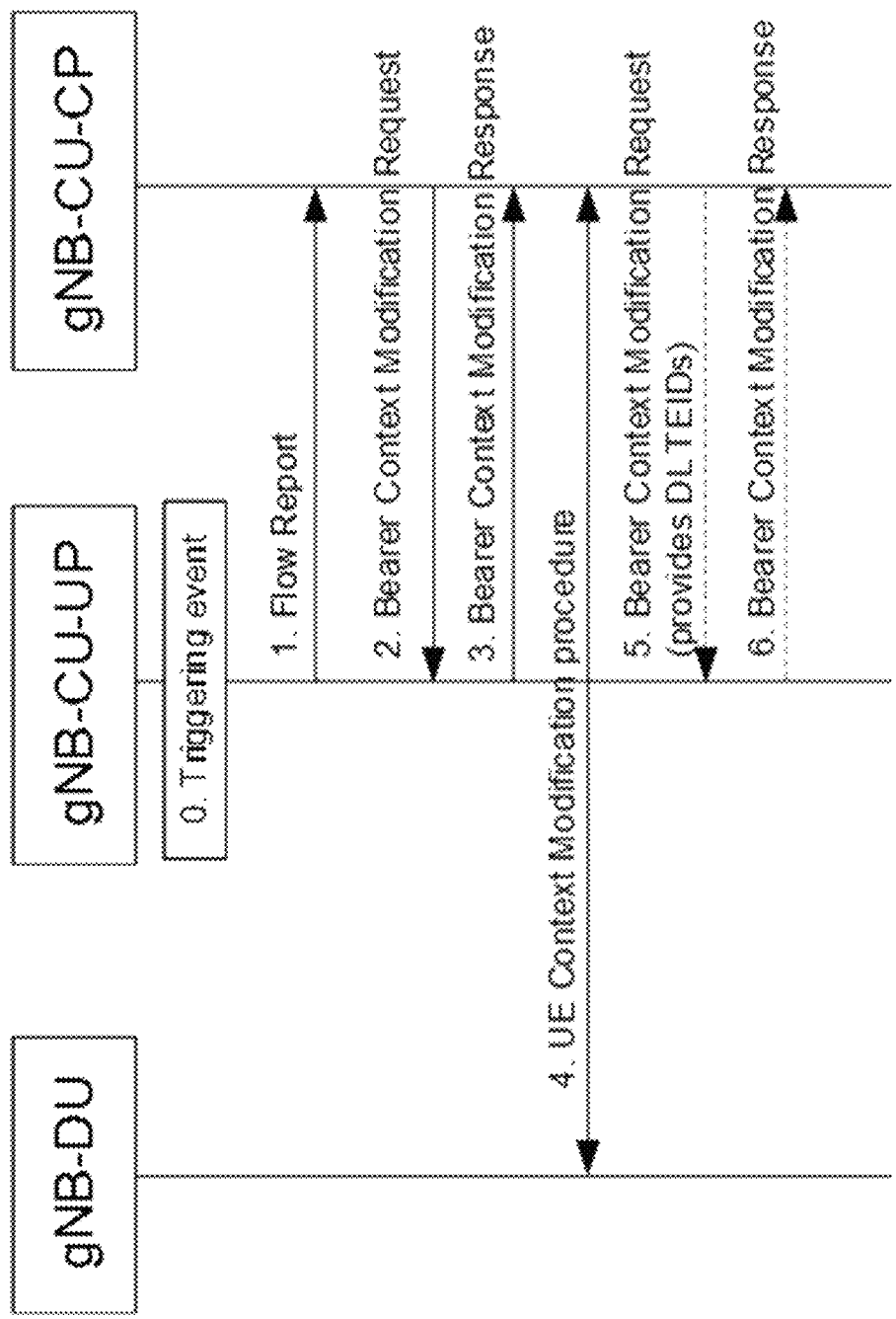
FIG. 5 illustrates an example reporting procedure from CU-UP to CU-CP, according to certain embodiments.

According to another particular embodiment, the CU-UP reports to CU-UP (as requested). FIG. 5 illustrates an example reporting procedure from CU-UP to CU-CP, according to certain embodiments. This example reporting procedure is based on the introduction of a new class-2 procedure (namely Flow Report). The procedure also shows a possible action taken by the CU-CP upon the reception of a Flow Report message. Note that this procedure depicted in FIG. 5 is provided as just one example reporting procedure.

As depicted the process flow is as follows:

0. An event triggers the CU-UP to report to CU-CP (e.g., UL traffic is detected for a QoS-flow for the first time, and the CU-CP requested corresponding reporting as discussed above with regard to FIG. 4).

1. The CU-UP sends the Flow Report message. A possible structure for the Flow Report message is shown below.

According to certain embodiments, flow report may be as follows:

| IE/Group Name | Presence | Range | IE type and reference | Semantics description | Criticality | Assigned Criticality |
|---|---|---|---|---|---|---|
| Message Type | M | | 9.3.1.X | | YES | reject |
| CU-CP UE E1AP ID | M | | 9.3.1.Y | | YES | reject |
| CU-UP UE E1AP ID | M | | 9.3.1.Z | | YES | reject |
| QoS Flow Report List | | 1 | | | YES | reject |
| >QoS Flow Report Item | | 1 ... <maxnooflows> | | | EACH | reject |
| >>QoS Flow Indicator | M | | | Identifies the QoS-Flow. | — | — |
| >>UL Traffic Detected | O | | | Indicates that UL traffic is detected for the first time. | — | — |
| >>DL Traffic Detected | O | | | Indicates that DL traffic is detected for the first time. | — | — |
| >>UL Threshold Reached | O | | | UL threshold breached. | — | — |
| >>DL Threshold Reached | O | | | DL threshold breached. | — | — |
| >>Inactive | O | | | The QoS-Flow is reported as inactive. | — | — |

2.-3.-4.-5.-6. Based on the information in the Flow Report, the CU-CP may decide to modify the Bearer Context in the CU-CP (e.g., add/remove radio bearers or change the flow-DRB mapping) to optimize the use of the radio resources. In case DRBs are established or removed or modified, the CU-CP may also need to inform the DU via UE Context Modification procedure. The CU-CP (and DU) may also decide to generate a new configuration for the UE and trigger RRC signaling to provide the new configuration (not shown in FIG. 5).

Figure 6:
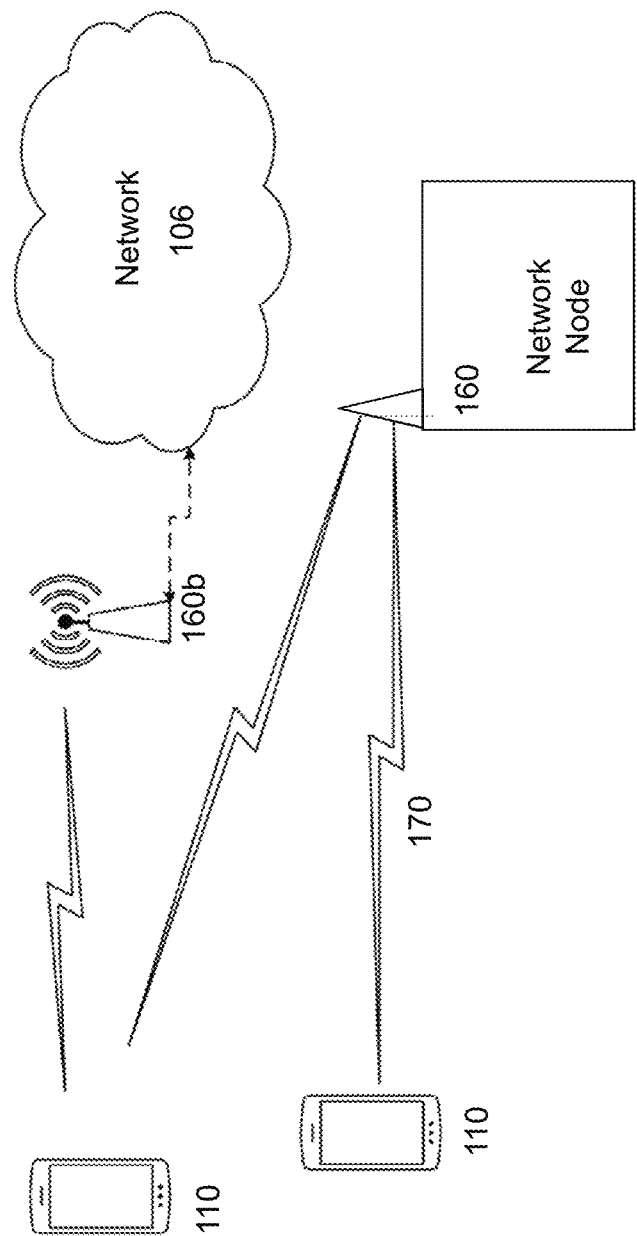
FIG. 6 illustrates an example network for exchanging information between a CU-CP of a network node and a CU-UP of the network node to manage QoS flows for the optimization of radio resources, in accordance with certain embodiments.

Although the subject matter described herein may be implemented in any appropriate type of system using any suitable components, the embodiments disclosed herein are described in relation to a wireless network, such as the example wireless network illustrated in FIG. 6.

Although the subject matter described herein may be implemented in any appropriate type of system using any suitable components, the embodiments disclosed herein are described in relation to a wireless network. FIG. 6 illustrates an example wireless network, according to certain embodiments. For simplicity, the wireless network of FIG. 6 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 7:
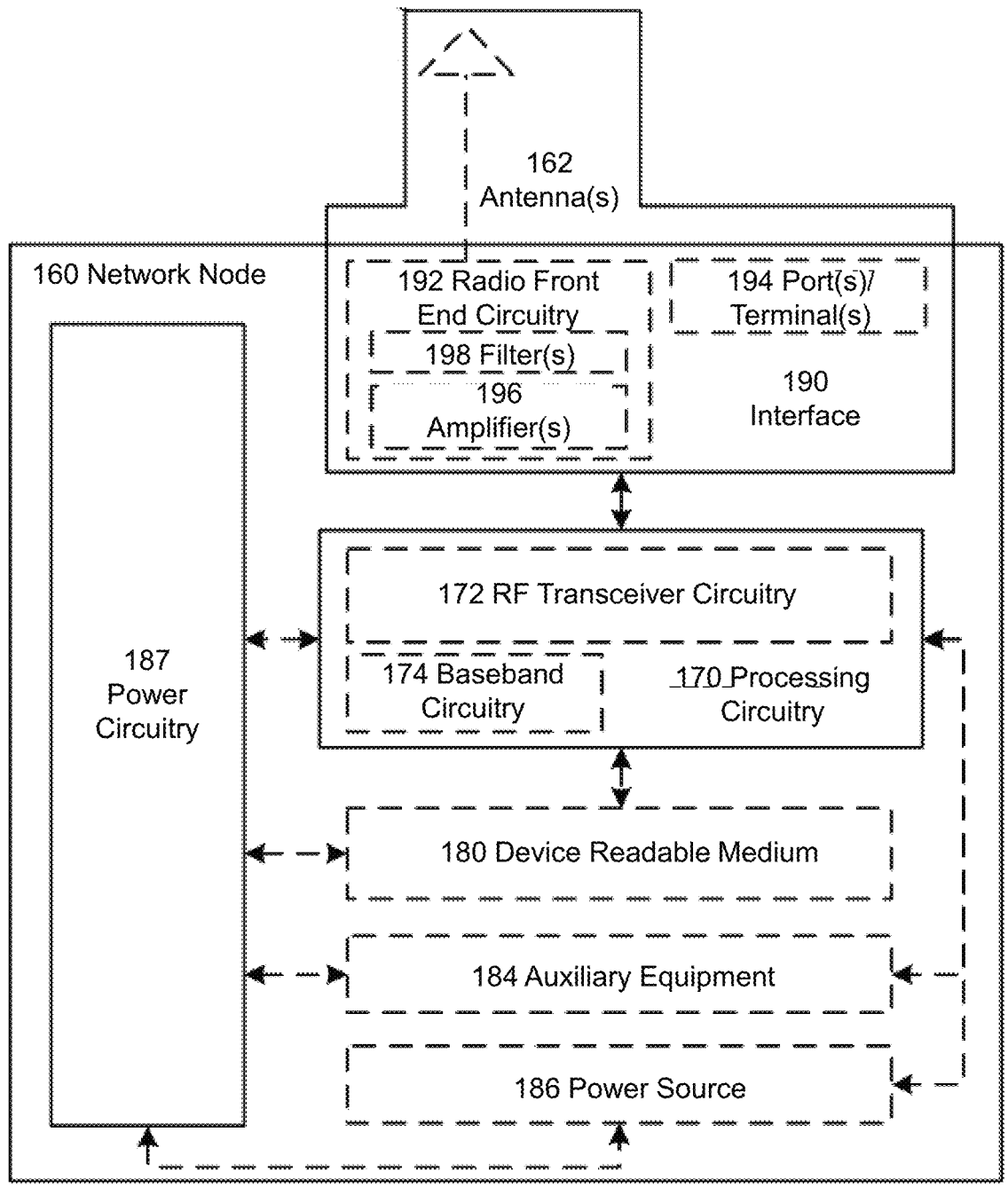
FIG. 7 illustrate an example network node for exchanging information between a CU-CP of a network node and a CU-UP of the network node to manage QoS flows for the optimization of radio resources, according to certain embodiments.

FIG. 7 illustrates an example network node 160, according to certain embodiments. As depicted, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 8:
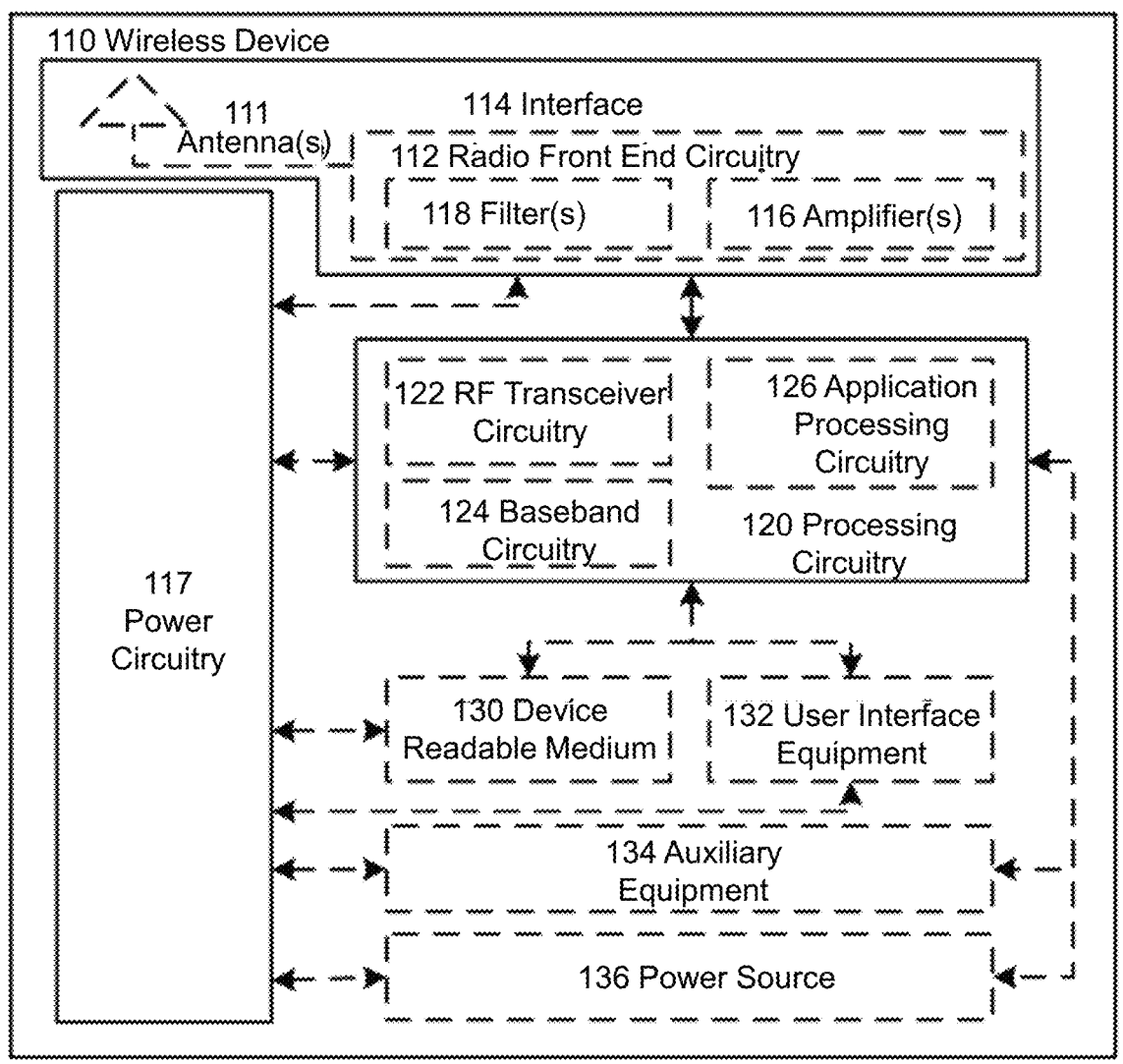
FIG. 8 illustrates an example wireless device, according to certain embodiments.

FIG. 8 illustrates an example WD, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 8, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated in FIG. 8, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 9:
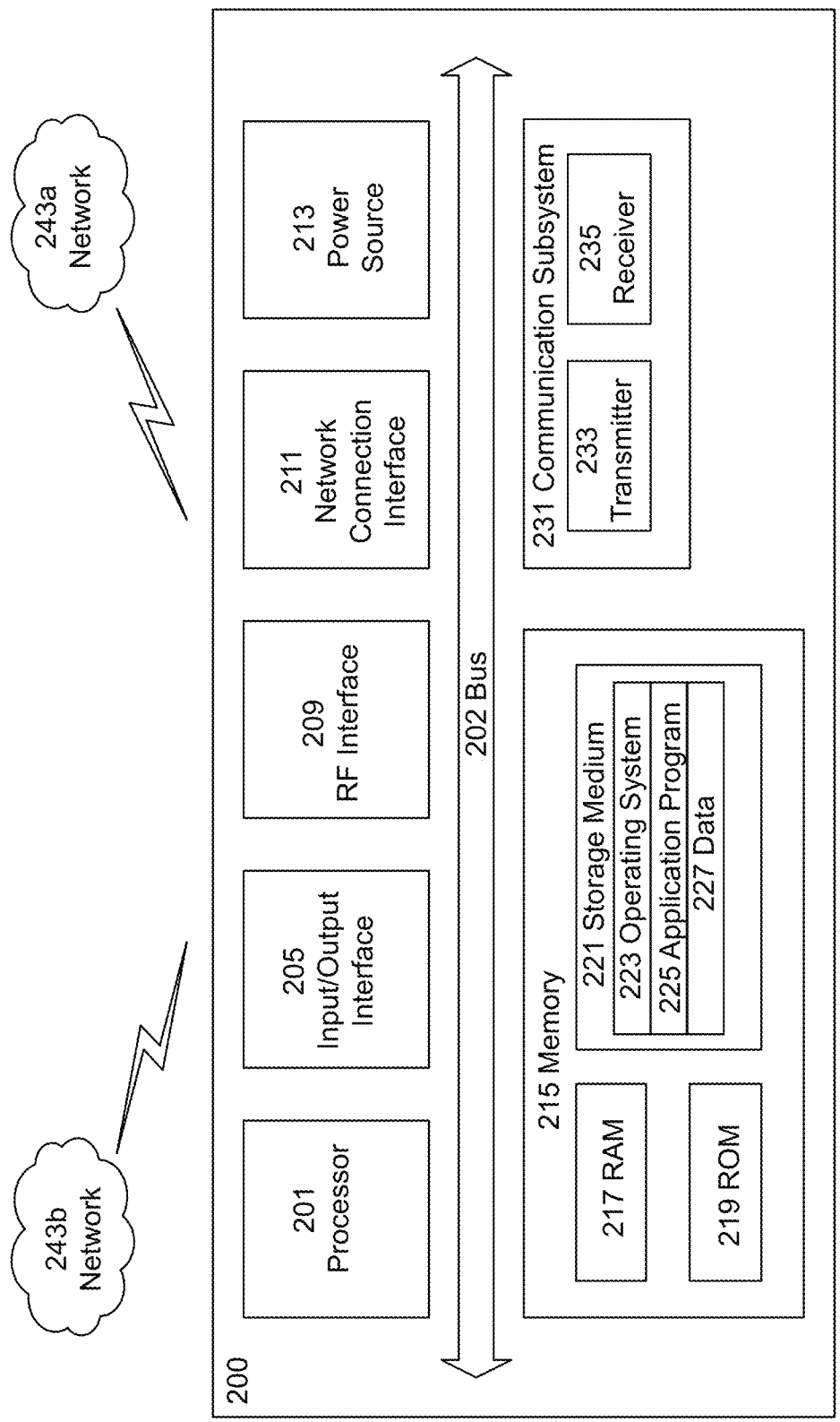
FIG. 9 illustrates an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non- volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
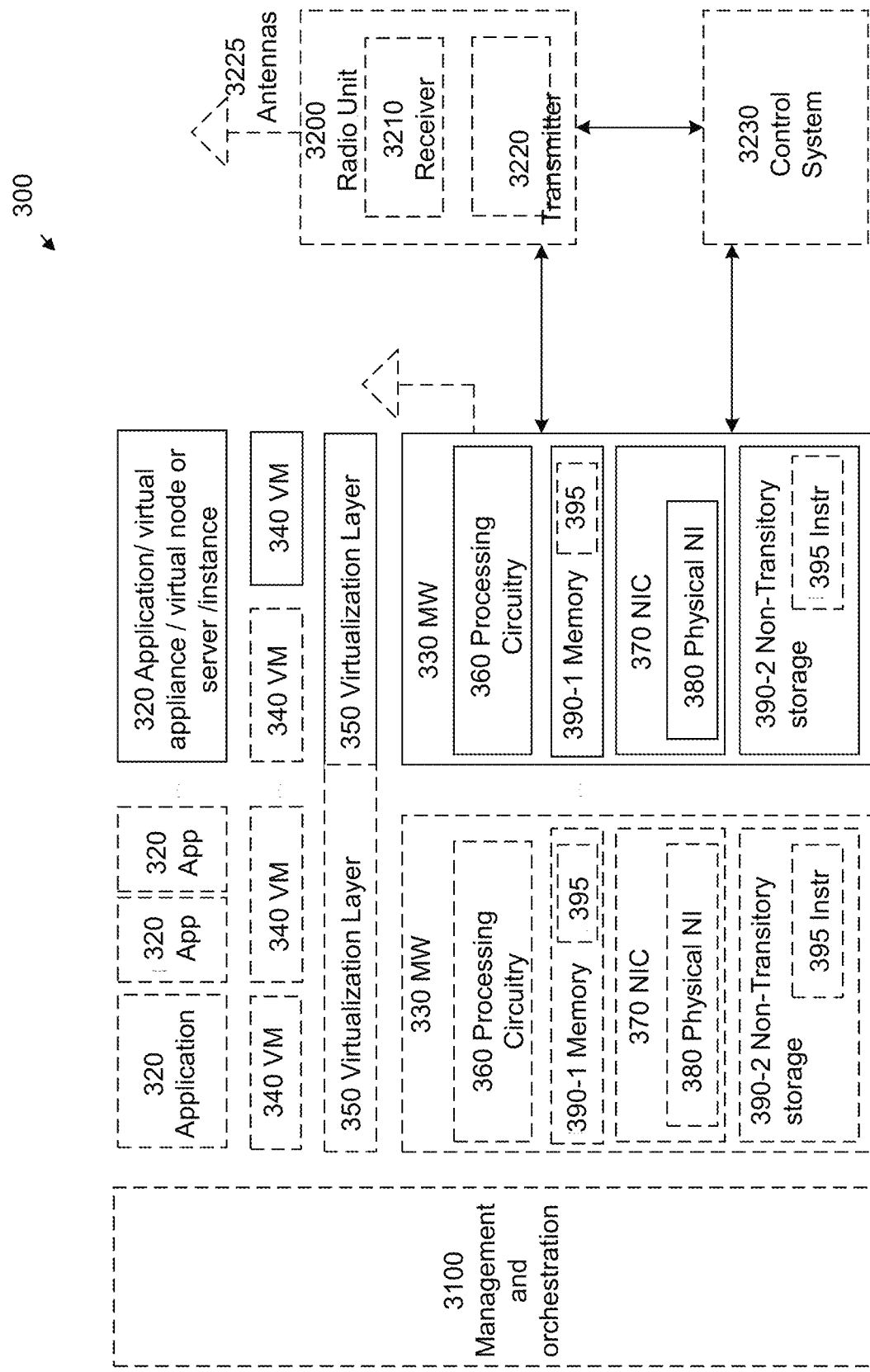
FIG. 10 illustrates an example virtualization environment, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 11:
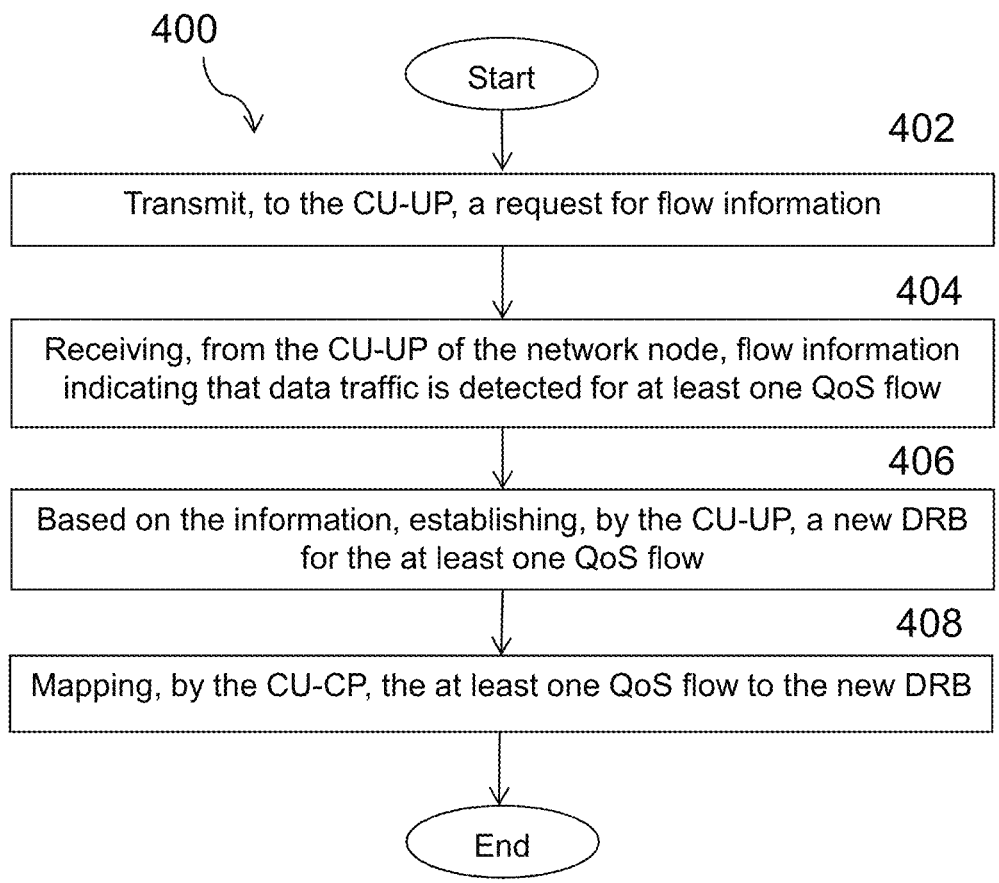
FIG. 11 illustrates an example method by a CU-CP of a network node for exchanging information with a CU-UP of the network node to manage QoS flows for the optimization of radio resources, according to certain embodiments.

FIG. 11 depicts a method performed by a CU-CP of a network node for exchanging information with a CU-UP of the network node to manage QoS flows for the optimization of radio resources, in accordance with particular embodiments. The method begins at step 402 when CU-CP transmits, to the CU-UP, a request for flow information. At step 404, CU-CP receives, from the CU-UP of the network node, flow information indicating that data traffic is detected for at least one QoS flow. Based on the information indicating that the data traffic is detected for the at least one QoS flow, CU-CP establishes a new data radio bearer (DRB) for the at least one QoS flow. CU-CP maps the at least one QoS flow to the new DRB.

In a particular embodiment, the flow information indicating that the data traffic is detected may be received from the CU-UP over an E1 interface. For example, the request for flow information may be inserted as an information element in the QoS-Flow descriptor in a E1 Bearer Context Setup Request message or an E1 Bearer Context Modification Request message. The information element may indicate to the CU-UP to report uplink or downlink traffic for the at least one QoS flow.

In a particular embodiment, prior to receiving the information indicating the data traffic is detected for the at least one QoS flow, the CU-CP may establishing a default DRB, map a plurality of QoS flows to the default DRB, the plurality of QoS flows including the at least one QoS flow, and, in response to receiving the information indicating that the data traffic is detected, remove the at least one QoS flow from the default DRB to map the at least one QoS flow to the new DRB.

In a particular embodiment, the request for flow information may include any one or more of the following:
- a request for a report when any downlink or uplink traffic is detected for the at least one QoS flow for a first time;
- a request for a report when downlink or uplink traffic is detected for any one or more of a plurality of QoS flows for a first time;
- a request for a report when downlink or uplink traffic is detected a predefined number of times for any one or more of a plurality of QoS flows
- a request to report when any QoS within a group of a plurality of QoS flows that are mapped to a default DRB becomes active;
- a request to report when a given amount of traffic is reached for the at least one QoS flow;
- a request to report when the at least one QoS flow can no longer be fulfilled or when the at least one QoS flow can be fulfilled again;
- a request for periodic reporting at a time interval an uplink or a downlink data rate for the at least one QoS flow; and/or
- a request for a report when an uplink or downlink data rate goes above or below a threshold.
- a request for a transmitted data volume for the at least one flow;

In a particular embodiment, CU-CP may use the flow information to determine how many DRBs to establish.

In a particular embodiment, CU-CP may receive additional information indicating that the at least one QoS flow has been inactive for an amount of time. CU-CP may remove the at least one QoS flow or remapping the at least one QoS flow to a default DRB. Additionally, if CU-CP determines that there are no additional QoS flows to be mapped to the new DRB, CU-CP may remove the new DRB.

Figure 12:
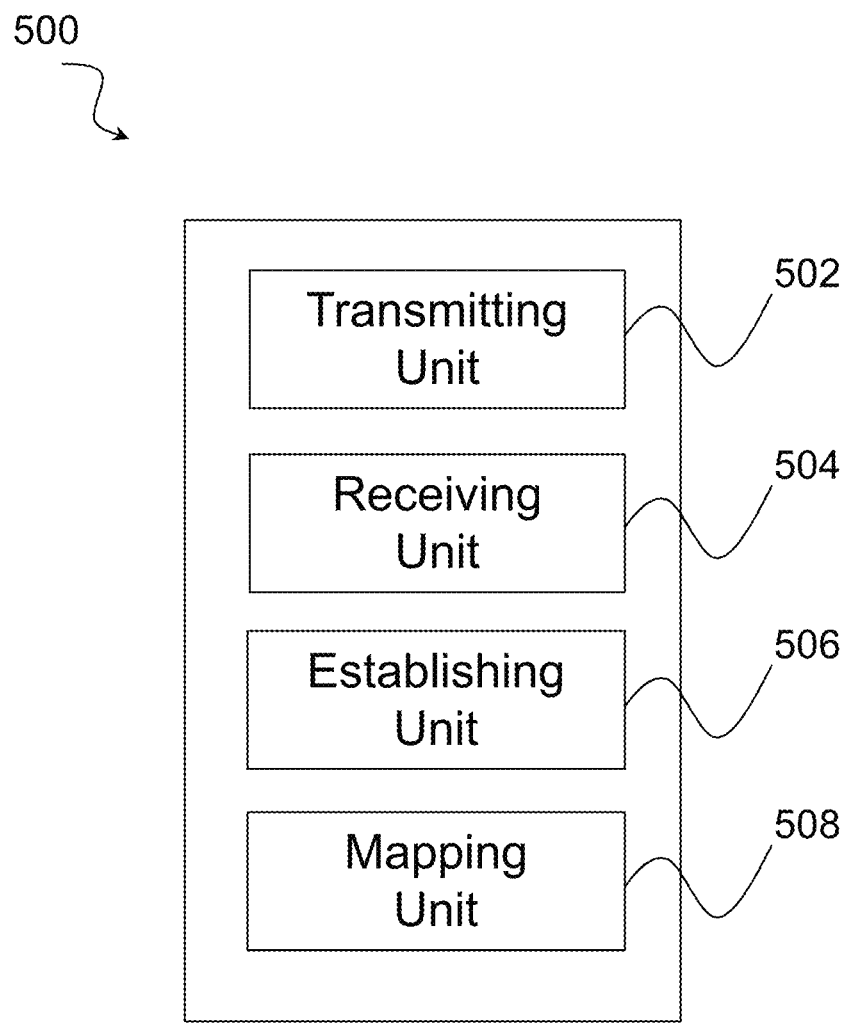
FIG. 12 illustrates an example virtual computing device for exchanging information with a CU-UP of the network node to manage QoS flows for the optimization of radio resources, according to certain embodiments.

FIG. 12 illustrates a schematic block diagram of a virtualization apparatus 500 in a wireless network (for example, the wireless network shown in FIG. 6). The apparatus may be implemented in a wireless device or network node (e.g., wireless device 110 or network node 160 shown in FIG. 6).

Apparatus 500 is operable to carry out the example method described with reference to FIG. 11 and possibly any other processes or methods disclosed herein. It is also to be understood that the method of FIG. 11 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 502, receiving unit 504, establishing unit 506, and mapping unit 508, and any other suitable units of apparatus 500 to perform corresponding functions according one or more embodiments of the present disclosure.

As illustrated in FIG. 12, apparatus 500 includes transmitting unit 502, receiving unit 504, establishing unit 506, and mapping unit 508. Transmitting unit 502 is configured to transmit, to the CU-UP, a request for flow information. Receiving unit 504 is configured to receive, from the CU-UP of the network node, information indicating that data traffic is detected for at least one QoS flow. Establishing unit 506 is configured to establish a new data radio bearer (DRB) for the at least one QoS flow based on the information indicating that the data traffic is detected for the at least one QoS flow. Mapping unit 508 is configured to map the at least one QoS flow to the new DRB.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 13:
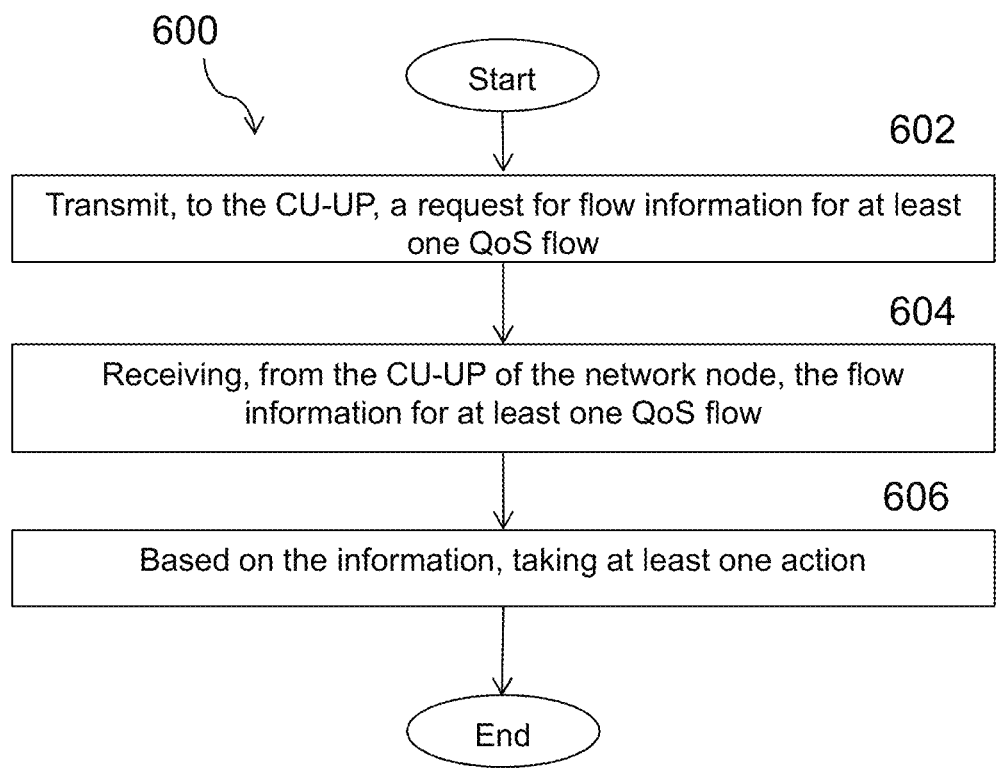
FIG. 13 illustrates an example method by a CU-CP of a network node for exchanging information with a CU-UP of the network node to manage QoS flows for the optimization of radio resources, according to certain embodiments.

FIG. 13 depicts another method performed by a CU-CP of a network node for exchanging information with a CU-UP of the network node to manage QoS flows for the optimization of radio resources, in accordance with particular embodiments. The method begins at step 602 when CU-CP transmits, to the CU-UP, a request for flow information for at least one QoS flow. At step 604, CU-CP receives, from the CU-UP of the network node, the flow information for the at least one QoS flow. Based on the flow information for the at least one QoS flow, the CU-CP takes at least one action.

In a particular embodiment, prior to receiving the flow information for the at least one QoS flow, the CU-CP establishes a default DRB and maps a plurality of QoS flows to the default DRB. The plurality of QoS flows include the at least one QoS flow. Additionally, the at least one action that is taken includes removing the at least one QoS flow from the default DRB and mapping the at least one QoS flow to a first DRB. In a further particular embodiment, the first DRB comprises an existing DRB. In another further embodiment, the first DRB comprises a new DRB and the at least one action includes establishing the first DRB comprising the new DRB in response to receiving the flow information for the at least one QoS flow.

In a particular embodiment, the flow information indicating that the data traffic is detected may be received from the CU-UP over an E1 interface. For example, the request for flow information may be inserted as an information element in the QoS-Flow descriptor in a E1 Bearer Context Setup Request message or an E1 Bearer Context Modification Request message. The information element may indicate to the CU-UP to report uplink or downlink traffic for the at least one QoS flow.

In a particular embodiment, the request for flow information may include any one or more of the following:
- a request for a report when any downlink or uplink traffic is detected for the at least one QoS flow for a first time;
- a request for a report when downlink or uplink traffic is detected for any one or more of a plurality of QoS flows for a first time;
- a request for a report when downlink or uplink traffic is detected a predefined number of times for any one or more of a plurality of QoS flows
- a request to report when any QoS within a group of a plurality of QoS flows that are mapped to a default DRB becomes active;
- a request to report when a given amount of traffic is reached for the at least one QoS flow;
- a request to report when a level of QoS for the at least one QoS flow can no longer be fulfilled or when a level of QoS for the at least one QoS flow can be fulfilled again;
- a request for periodic reporting at a time interval an uplink or a downlink data rate for the at least one QoS flow;
- a request for a report when an uplink or downlink data rate goes above or below a threshold;
- a request for a transmitted data volume for the at least one flow; and/or
- a poll that is transmitted over the E1 interface.

In a particular embodiment, when taking the at least one action, the CU-CP may use the flow information to determine how many DRBs to establish.

In a particular embodiment, CU-CP may receive additional information indicating that the at least one QoS flow has been inactive for an amount of time. CU-CP may remove the at least one QoS flow or remapping the at least one QoS flow to a default DRB. Additionally, if CU-CP determines that there are no additional QoS flows to be mapped to the new DRB, CU-CP may remove the new DRB.

Figure 14:
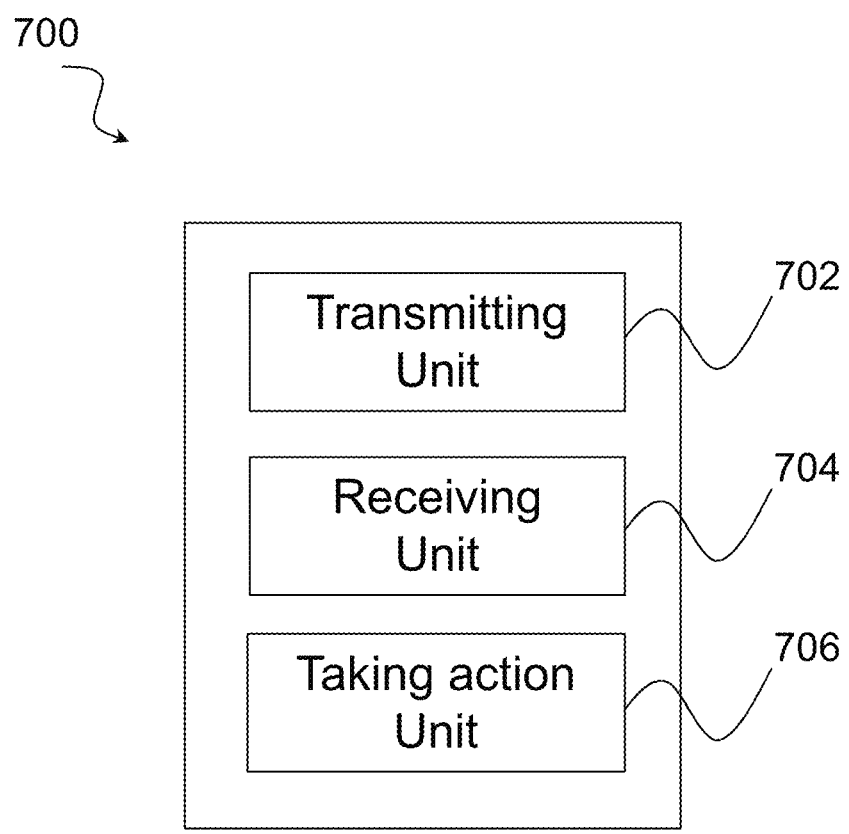
FIG. 14 illustrates an example virtual computing device for exchanging information with a CU-UP of the network node to manage QoS flows for the optimization of radio resources, according to certain embodiments.

FIG. 14 illustrates a schematic block diagram of a virtualization apparatus 700 in a wireless network (for example, the wireless network shown in FIG. 6). The apparatus may be implemented in a wireless device or network node (e.g., wireless device 110 or network node 160 shown in FIG. 6). Apparatus 700 is operable to carry out the example method described with reference to FIG. 13 and possibly any other processes or methods disclosed herein. It is also to be understood that the method of FIG. 13 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc.

Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 702, receiving unit 704, taking action unit 706, and any other suitable units of apparatus 700 to perform corresponding functions according one or more embodiments of the present disclosure.

As illustrated in FIG. 14, apparatus 700 includes transmitting unit 702, receiving unit 704, and taking action unit 706. Transmitting unit 702 is configured to transmit, to the CU-UP, a request for flow information for at least one QoS flow. Receiving unit 704 is configured to receive, from the CU-UP of the network node, the flow information for at least one QoS flow. Taking action unit 706 is configured to take at least one action based on the flow information for the at least one QoS flow.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
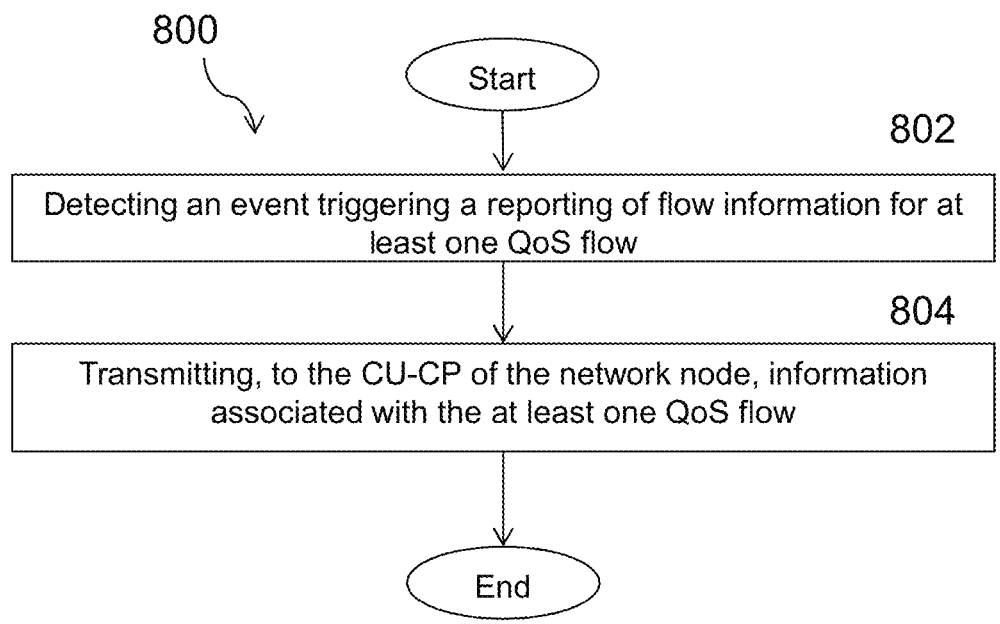
FIG. 15 illustrates an example method by a CU-UP of a network node for exchanging information with a CU-CP of the network node to manage QoS flows for the optimization of radio resources, according to certain embodiments.

FIG. 15 depicts a method performed by a CU-UP of a network node for exchanging information with a CU-CP of the network node to manage QoS flows for the optimization of radio resources, in accordance with particular embodiments. The method begins at step 802 when CU-UP detects an event triggering a reporting of flow information for at least one QoS flow. At step 804, CU-UP transmits, to the CU-CP of the network node, information associated with the at least one QoS flow.

In a particular embodiment, the flow information may be transmitted to the CU-CP over an E1 interface.

In a particular embodiment, the request for flow information may be received as an information element inserted in the QoS-Flow descriptor in a E1 Bearer Context Setup Request message or an E1 Bearer Context Modification Request message, the information element indicating to the CU-UP to report uplink or downlink traffic for the at least one QoS flow.

In a particular embodiment, CU-UP may receive, from the CU-CP of the network node, a request for flow information. The request may identify the event for triggering the reporting. In various embodiments, the event may include any one or more of:
- detection of data traffic for the at least one QoS flow;
- a first-time detection of any downlink or uplink traffic for the at least one QoS flow;
- detection of downlink or uplink traffic for any one or more of a plurality of QoS flows for a first time;
- detection a predefined number of times of downlink or uplink traffic for any one or more of a plurality of QoS flows, the plurality of QoS flows including the at least one QoS flow;
- detection that any QoS flow within a group of a plurality of QoS flows that are mapped to a default DRB have become active;
- determining that an amount of traffic for the at least one QoS flow has reached a threshold; and/or
- detection that a level of QoS for the at least one QoS flow can no longer be fulfilled or when the level of QoS for the at least one QoS flow can be fulfilled again.

In particular embodiments, the request may include any one or more of:
- a request for periodic reporting at a time interval an uplink or a downlink data rate for the at least one QoS flow;
- a request for a report when an uplink or downlink data rate goes above or below a threshold;
- a poll that is received over the E1 interface;
- a request for a transmitted data volume for the at least one flow;

In a particular embodiment the CU-UP may also transmit, to the CU-CP of the network node, information indicating that the at least one QoS flow has been inactive for an amount of time.

Figure 16:
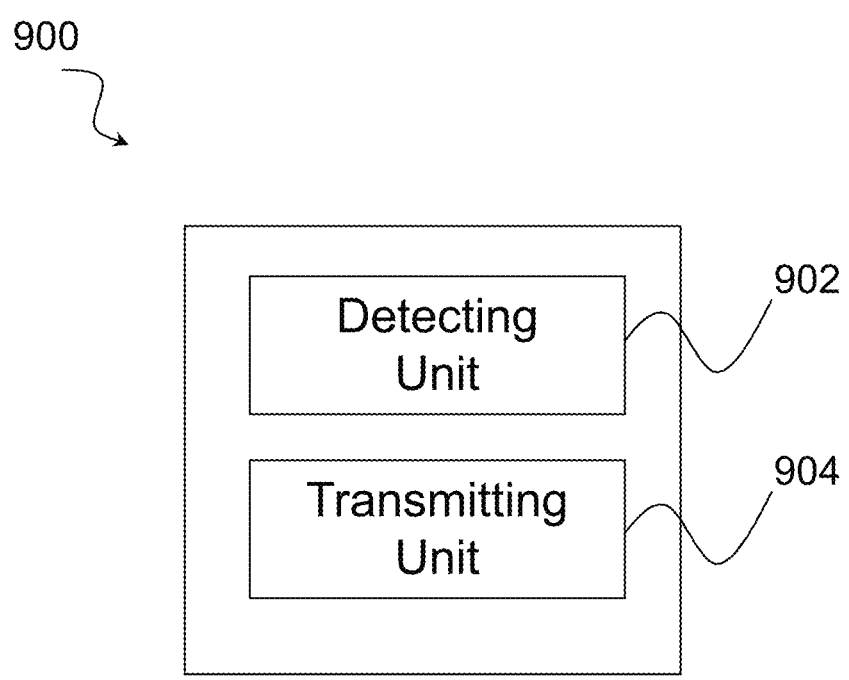
FIG. 16 illustrates an example virtual computing device for exchanging information with a CU-CP of the network node to manage QoS flows for the optimization of radio resources, according to certain embodiments.

FIG. 16 illustrates a schematic block diagram of a virtualization apparatus 900 in a wireless network (for example, the wireless network shown in FIG. 6). The apparatus may be implemented in a wireless device or network node (e.g., wireless device 110 or network node 160 shown in FIG. 6). Apparatus 900 is operable to carry out the example method described with reference to FIG. 15 and possibly any other processes or methods disclosed herein. It is also to be understood that the method of FIG. 15 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause detecting unit 902, transmitting unit 904, and any other suitable units of apparatus 900 to perform corresponding functions according one or more embodiments of the present disclosure.

As illustrated in FIG. 16, apparatus 900 includes detecting unit 902 and transmitting unit 904. Detecting unit 902 is configured to detect an event triggering a reporting of flow information for at least one QoS flow. Transmitting 904 is configured to transmit, to the CU-CP of the network node, information associated with the at least one QoS flow.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SDB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a central unit-control plane (CU-CP) of a network node for exchanging information with a central unit-user plane (CU-UP) of the network node to manage Quality of Service (QoS) flows for the optimization of radio resources, the method comprising:
prior to receiving flow information, establishing a default data radio bearer (DRB) and mapping a plurality of QoS flows to the default DRB;
receiving, from the CU-UP, flow information indicating that data traffic is detected for at least a first QoS flow;
based on the flow information for at least the first QoS flow, removing the first QoS flow from the default DRB and establishing a new DRB for the first QoS flow;
mapping the first QoS flow to the new DRB; and
transmitting, to the CU-UP, message indicating at least one of:

the new DRB has been added, and
a mapping of QoS flows to DRBs has changed.

2. The method of claim 1, wherein the message comprises an E1 Bearer Context Setup Request message or an E1 Bearer Context Modification Request message.

3. The method of claim 1, comprising:
transmitting, to the CU-UP, a request for the flow information, and
wherein the flow information is received from the CU- based on the request.

4. The method of claim 3, wherein:
the request for the flow information comprises a request for the flow information when any downlink or uplink traffic is detected for a first time, and
the flow information for at least the first QoS flow indicates that the downlink or uplink traffic is detected for at least the first QoS for the first time.

5. The method of claim 3, wherein the request for the flow information comprises at least one of:
a request for the flow information when downlink or uplink traffic is detected a predefined number of times for any one or more of a plurality of QoS flows that include at least the first QoS flow,
a request for the flow information when a given amount of traffic is reached for at least the first QoS flow,
a request for the flow information when any QoS flow within a group of a plurality of QoS flows that are mapped to a default DRB becomes active,
a request for the flow information when an uplink or downlink data rate goes above or below a threshold,
a request for the flow information when a level of QoS for at least the first QoS flow can no longer be fulfilled or when a level of QoS for at least the first QoS flow can be fulfilled again,
a request for a periodic reporting of an uplink or a downlink data rate for at least the first QoS flow, the request comprising a time interval for the periodic reporting, and
a request for a transmitted data volume for at least the first QoS flow.

6. The method of claim 1, comprising using, by the CU-CP, the flow information to determine how many DRBs to establish.

7. The method of claim 1, comprising:
receiving, from the CU-UP of the network node, information indicating that at least the first QoS flow has been inactive for an amount of time; and
performing at least one action comprising at least one of:
removing at least the first QoS flow;
remapping at least the first QoS flow from the new DRB to the default DRB; and
determining that there are no additional QoS flows to be mapped to the new DRB and removing the new DRB.

8. A method performed by a central unit-user plane (CU-UP) of a network node for exchanging information with a central unit-control plane (CU-CP) of the network node to manage Quality of Service (QoS) flows for the optimization of radio resources, the method comprising:
prior to detecting flow information, establishing a default Data Radio Bearer (DRB) and mapping a plurality of QoS flows to the default DRB;
detecting flow information for at least a first QoS flow;
based on the flow information for at least the first QoS flow, removing the first QoS flow from the default DRB and mapping at least the first QoS flow to a new DRB;
transmitting, to the CU-CP, flow information indicating that data traffic is detected for at least the first QoS flow; and
receiving, from the CU-CP, a message indicating at least one of:
the new DRB has been added, and
a mapping of QoS flows to DRBs has changed.

9. The method of 8, wherein the message comprises an E1 Bearer Context Setup Request message or an E1 Bearer Context Modification Request message.

10. The method of claim 8, comprising:
transmitting, to the CU-UP, a request for the flow information, and
wherein the flow information is received from the CU- based on the request.

11. The method of claim 10, wherein:
the request for the flow information comprises a request for the flow information when any downlink or uplink traffic is detected for a first time, and
the flow information for the at least first QoS flow indicates that the downlink or uplink traffic is detected for the at least first QoS flow for the first time.

12. The method of claim 10, wherein the request for the flow information comprises at least one of:
a request for the flow information when downlink or uplink traffic is detected a predefined number of times for any one or more of a plurality of QoS flows that includes at least the first QoS flow,
a request for the flow information when a given amount of traffic is reached for at least the first QoS flow,
a request for the flow information when any QoS flow within a group of a plurality of QoS flows that are mapped to a default DRB becomes active,
a request for the flow information when an uplink or downlink data rate goes above or below a threshold,
a request for the flow information when a level of QoS for at least the first QoS flow can no longer be fulfilled or when a level of QoS for at least the first QoS flow can be fulfilled again,
a request for a periodic reporting of an uplink or a downlink data rate for at least the first QoS flow, the request comprising a time interval for the periodic reporting, and
a request for a transmitted data volume for the at least one flow.

13. The method of claim 8, comprising using, by the CU-CP, the flow information to determine how many DRBs to establish.

14. The method of claim 8, comprising:
receiving, from the CU-UP of the network node, information indicating that at least the first QoS flow has been inactive for an amount of time; and
performing at least one action comprising at least one of:
removing at least the first QoS flow;
remapping at least the first QoS flow from the new DRB to the default DRB; and
determining that there are no additional QoS flows to be mapped to the new DRB and removing new DRB.

15. A network node for managing Quality of Service (QoS) flows for the optimization of radio resources, the network node, comprising:
processing circuitry operating as a central unit-control plane (CU-CP) of the network node, the processing circuitry configured to:
prior to receiving flow information, establishing a default data radio bearer (DRB) and mapping a plurality of QoS flows to the default DRB;

receive, from a central unit-user plane (CU-UP) of the network node, the flow information indicating that data traffic is detected for at least a first QoS flow;
based on the flow information for at least the first QoS flow, remove the first QoS flow from the default DRB and establishing a new DRB for the first QoS flow;
map the first QoS flow to the new DRB; and
transmit, to the CU-UP, a message indicating at least one of:
   the new DRB has been added, and
   a mapping of QoS flows to DRBs has changed.

16. A network node for managing Quality of Service (QoS) flows for the optimization of radio resources, the network node, comprising:
processing circuitry operating as a central unit-user plane (CU-UP) of the network node, the processing circuitry configured to:
prior to detecting flow information, establish a default Data Radio Bearer (DRB) and mapping a plurality of QoS flows to the default DRB;
detect flow information for at least a first QoS flow;
based on the flow information for at least the first QoS flow, remove the first QoS flow from the default DRB and mapping at least the first QoS flow to a new DRB;
transmit, to the central unit-control plane (CU-CP), flow information indicating that data traffic is detected for at least the first QoS flow; and
receive, from the CU-CP, a message indicating at least one of:
   the new DRB has been added, and
   a mapping of QoS flows to DRBs has changed.

\* \* \* \* \*